United States Patent [19]

Neff

[11] Patent Number: 4,566,490

[45] Date of Patent: Jan. 28, 1986

[54] DIRECT SOLENOID OPERATED VALVE WITH MINIMAL TOLERANCE ACCUMULATION

[75] Inventor: James A. Neff, Bloomfield Township, Oakland County, Mich.

[73] Assignee: MAC Valves, Inc., Wixom, Mich.

[21] Appl. No.: 320,506

[22] Filed: Nov. 12, 1981

[51] Int. Cl.[4] .......................................... F15B 13/044
[52] U.S. Cl. ............................ 137/625.65; 251/129.10
[58] Field of Search ................... 137/625.65; 251/129, 251/137

[56] References Cited

U.S. PATENT DOCUMENTS

| | | | |
|---|---|---|---|
| 2,436,992 | 3/1948 | Ernst | 251/129 X |
| 3,324,885 | 6/1967 | Beech | 137/625.65 X |
| 3,538,954 | 11/1970 | Fagerlie | 251/129 X |
| 3,878,859 | 4/1975 | Grob et al. | 251/129 X |
| 4,074,700 | 2/1978 | Engle | 137/625.65 X |
| 4,100,519 | 7/1978 | Neff | 335/262 |
| 4,267,862 | 5/1981 | Neff et al. | 137/625.64 |

Primary Examiner—Gerald A. Michalsky
Attorney, Agent, or Firm—Robert G. Mentag

[57] ABSTRACT

A four-way directional flow control air valve having a valve spool movable to a first position. A solenoid has a pole piece seated against the valve body adjacent one end of the valve spool. An end of the valve spool is seated against the solenoid pole piece when the valve spool is in the first position. A pusher rod on the valve spool extends through a bore in the pole piece into engagement with a solenoid armature, whereby when the solenoid is energized, the armature moves the pusher rod and the valve spool from the first position to a second position a distance equal to the difference in length between the pole piece and the pusher rod. The valve spool can be moved back alternatively by a return spring or a second solenoid engageable with the other end of the valve spool in the same manner as the first solenoid moves the valve spool to the second position.

9 Claims, 2 Drawing Figures

DIRECT SOLENOID OPERATED VALVE WITH MINIMAL TOLERANCE ACCUMULATION

TECHNICAL FIELD

This invention relates generally to the valve art, and more particularly, to a four-way directional flow control air valve which employs a valve spool that is operated directly by a solenoid with a minimum tolerance accumulation, to provide a short stroke of the valve spool with maximum air flow control efficiency. The valve of the present invention is adapted for use in an air flow line for controlling the directional flow of air in the line as, for example, an air supply line connected to both ends of an air cylinder.

BACKGROUND ART

It is known in the air valve art to provide air valves with valve spools operated by solenoids. Heretofore, in four-way directional flow control air valves which employed a valve spool directly operated by a solenoid, the valve spool was stopped by a suitable stop of some sort in the solenoid cover. Such prior art direct solenoid operated valve spool structures included many tolerances in the manufacture of the various parts of the solenoid, including the cover and the cover gasket. It was impossible, with such prior art structure, to provide a direct solenoid operated valve with minimum tolerance accumulation so as to provide an accurate short stroke of a solenoid to impart a similar accurate short stroke to a four-way valve spool. In such prior art direct solenoid operated directional flow control air valves it was also necessary to account for the various tolerances in manufacturing the valve spool to provide a desired valve spool travel.

DISCLOSURE OF THE INVENTION

In accordance with the present invention, a four-way directional flow control air valve is provided which incorporates a short stroke of a valve spool to control the flow of air under pressure to one end of an air cylinder, while exhausting the air from the other end of the air cylinder and then reversing said air flow conditions with a short stroke of the air valve. The valve spool is movable in one direction by a directly engagable solenoid, and in the other by a return spring, or it may be operated in both directions by directly engaged solenoids. The valve spool is positioned in an initial position with one end seated directly against the pole piece of a solenoid, and said pole piece is seated against the adjacent end of the valve body in which the valve spool is operatively mounted. All of the tolerances for manufacturing the valve spool to a correct length for changing the flow of pressurized air through the valve to one end of an air cylinder and for controlling the exhaustion of air from the other end of the air cylinder to an exhaust system can be controlled from the end of the valve body against which the aforementioned pole piece is seated. Also, the tolerances for the movable parts of the solenoid, namely the length of the pole piece, a pusher rod, and the position of the armature, can be accurately determined with a minimum of tolerance accumulation. The direct solenoid operated valve of the present invention provides a four-way directional flow control air valve with flow control efficiency, a short stroke, and a minimum power solenoid so as to provide directional flow control air operations with a minimum of energy used.

BEST MODE OF CARRYING OUT THE INVENTION

Figure 1:
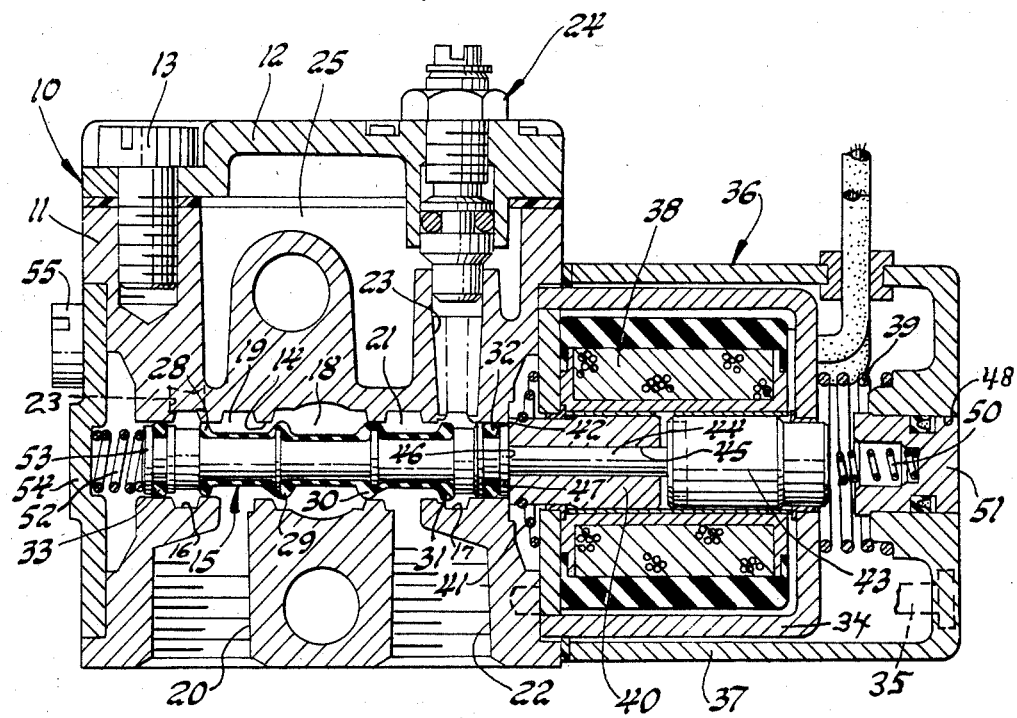
FIG. 1 is a longitudinal, elevation section view of a four-way directional flow control air valve provided with a valve spool that is directly operated by a solenoid in one direction.

Referring now to the drawings, and in particular to FIG. 1, the numeral 10 generally designates a first illustrative embodiment of a four-way directional flow control air valve made in accordance with the principles of the present invention. The valve 10 includes a valve body 11 which is enclosed on the top side thereof by a top end cover plate 12, which is releasably secured in position on the valve body 11 by a plurality of suitable machine screws 13. A horizontal, longitudinal valve bore 14 is formed through the valve body 11, and it is open at each end thereof. A conventional valve spool, generally indicated by the numeral 15, is slidably mounted in the valve spool bore 14.

As shown in FIG. 1, a centrally disposed pressurized air inlet chamber 18 communicates with the valve spool bore 14. A pair of cylinder chambers 19 and 21 are formed on opposite sides of the inlet chamber, and they communicate with the valve spool bore 14 and they are separated from the inlet chamber 18 by a pair of usual lands (not numbered). The cylinder chambers 19 and 21 are connected to a pair of cylinder ports 20 and 22, respectively. A pair of exhaust chambers 16 and 17 are formed in the valve body 11, and communicate with the valve spool bore 14 at positions outboard of the cylinder chambers 19 and 21, respectively. Each of the exhaust chambers 16 and 17 are connected by passages 23 to a common exhaust chamber 25. As illustrated, each of the exhaust passageways 23 has mounted therein an adjustable flow control valve, generally indicated by the numeral 24. However, it will be understood that use of flow controls as 23 is optional, and a plaincover 12 without flow controls may be employed.

The valve spool 15 is provided with an annular valve element 28, which is slidably mounted in the land in the valve spool bore 14, between the exhaust chamber 16 and the cylinder chamber 19 for controlling flow between these chambers. The valve spool 15 is further provided with a pair of centrally disposed, spaced apart, annular valve elements 29 and 30 which control the flow over the lands in the valve bore 14 between the inlet chamber 18 and the two cylinder chambers 19 and 21, respectively. The valve spool 15 is also provided with a fourth annular valve element 31, which controls the flow of air over the land in the valve spool bore 14 between the valve chamber 21 and the exhaust chamber 17. The valve spool 15 is further provided with an O-ring seal 32 on the right end thereof, and an O-ring seal 33 at the left end thereof, and said seals 32 and 33 are slidably mounted in the outer end portions of the valve spool bore 14.

The numeral 36 generally designates a solenoid which is provided with a cover or housing 37. The solenoid 36 is secured to the valve body 11 by suitable machine screws 35. The solenoid 36 includes a support frame 34 which operatively supports the usual coil assembly 38. The frame 34 and the coil assembly 38 are biased into seating engagement against the adjacent face of the valve body 11 by a suitable spring 39. A spring biased pole piece 40 is slidably mounted in a core guide which is axially disposed in the coil assembly 38. A spring 41 normally biases the outer end 47 of the pole piece 40 into seating engagement against the valve body recessed end wall face 42 that surrounds the right end of the valve spool bore 14, as shown in FIG. 1. A solenoid plunger, or armature, 43 is slidably mounted in the core guide in the central bore in the coil assembly 38, and its inner end is operatively seated against the outer end of a reduced diameter, integral valve spool extension shaft or pusher rod 44. The valve spool extension shaft 44 is slidably mounted through an axial bore 45 formed through the pole piece 40. The solenoid armature 43 is positioned in close proximity to the outer end of the valve spool extension shaft 44. A manual operator 51 is slidably mounted in a bore 48 in the outer end wall of the solenoid cover 37, and it carries a spring 50. The details of the structure of solenoid 36 are described more fully in U.S. Pat. No. 4,100,519, and the description of the parts of the solenoid in that patent which are also shown in this application, but not described in detail, are incorporated herein by reference.

The valve spool 15 is normally biased to the initial position shown in FIG. 1, with its right end 46 in seating engagement against the outer end 47 of the pole piece 40, by a return spring 52. The spring 52 is disposed in a spring chamber with one end abutting the left end 53 of the valve spool 15, and the other end seated against the inner wall of a pocket on an enclosure plate 54. The spring chamber closure plate 54 is releasably secured to the valve body 11 by suitable machine screws 55.

In use, the cylinder ports 20 and 22 would be connected, for example, to the opposite ends of an air cylinder to be controlled by pressurized air. In the initial position of the valve spool 15, as shown in FIG. 1, pressurized air would flow from the inlet chamber 18, which would be connected by suitable means to a source of pressurized air, and past the annular valve element 29 and through the valve bore 14 and into the cylinder chamber 19 and out through the cylinder port 20. Simultaneously, air from the other end of the cylinder would be exhausted into the cylinder port 22, and through the cylinder chamber 21, and out through the exhaust chamber 17 and the exhaust passage 23 into the exhaust chamber 25, from where it would be conducted to the atmosphere, or any other suitable exhaust point. When the solenoid 36 is energized, the armature 43 is moved to the left, as viewed in FIG. 1, and it will move the valve spool extension shaft 44 to the left to reverse the aforementioned flow conditions. The last mentioned movement of the valve spool 15 will move the annular valve element 28 into the exhaust chamber 16 to permit air flow into the exhaust chamber 16 from the cylinder chamber 19 and cylinder port 20. The right end annular valve element member 31 will move into the land in the valve bore 14 and block flow between the cylinder chamber 21 and the exhaust chamber 17. The annular valve elements 29 and 30 will be moved to the left to close communication between the inlet chamber 18 and the cylinder chamber 19, and open communication between the inlet chamber 18 and the cylinder chamber 21 to admit pressurized air into the cylinder port 22 and to the other end of the air cylinder being controlled by the valve 10, while exhausting air from the opposite end of the air cylinder into the cylinder port 20 and out through the cylinder chamber 19 and through the valve bore 14 and out through the exhaust chamber 16 and passageway 23 to the exhaust chamber 25, and then to the atmosphere, or to any other suitable exhaust point.

The valve 10 is a very short stroke valve, and tolerances are very critical in such a valve. The structure of valve 10 minimizes the tolerance accumulation of the various parts of the valve, to provide for an accurate short stroke of the valve spool 15. The employment of a very short stroke of the valve spool 15 permits the saving of energy, since it may be operated by a very small solenoid to provide the necessary force for such a short stroke.

The valve structure illustrated in FIG. 1 permits the tolerances for machining the valve body 11 to be determined in a direction to the left of the right end face 42 of the valve body 11. The valve spool 15 is symmetrical. The locations of elements 28 through 31 are controlled from one end of the spool, namely the right end 46 of the spool which abuts the outer end 47 of the pole piece. The overall length of the valve spool 15 is controlled to minimize tolerance accumulation in the event that the valve spool 15 is reversed during assembly of the valve or during a repair operation of the valve. The valve body right end face 42 is the critical point from which the tolerances of the valve spool 15 are controlled, and from which the tolerances relating to the length of the pole piece 40 and the length of the pusher rod 44 are controlled. The distance between the rear flat end of the pole piece 40 and the front flat end of the solenoid armature 43 comprises the length of stroke that will be imparted to the valve spool 15 when the armature 43 is moved to the left, as viewed in FIG. 1. In one embodiment, the stroke of the valve spool 15 was 0.026", and in such a short movement of the valve spool, the annular valve elements 29 through 31 were shifted a short distance sufficient to reverse the flow of air through the valve 10.

It will be understood that the various tolerances involved in the cover 37, core assembly 38 and other parts of the solenoid 36 do not affect the accurate controlling of the positioning of the valve spool 15 by the direct valve spool operating structure of the valve 10. The spring 41 is a conventional part of the solenoid 36, and it has two functions in that it holds the pole piece 40 against the surface 42 of the valve body 11 to maintain that position of the pole piece 40, and to permit the pole piece 40 to lift off of the valve body wall surface 42 to seal the solenoid magnetically and prevent damage to the solenoid if the valve spool 15 is jammed during operation.

Figure 2:
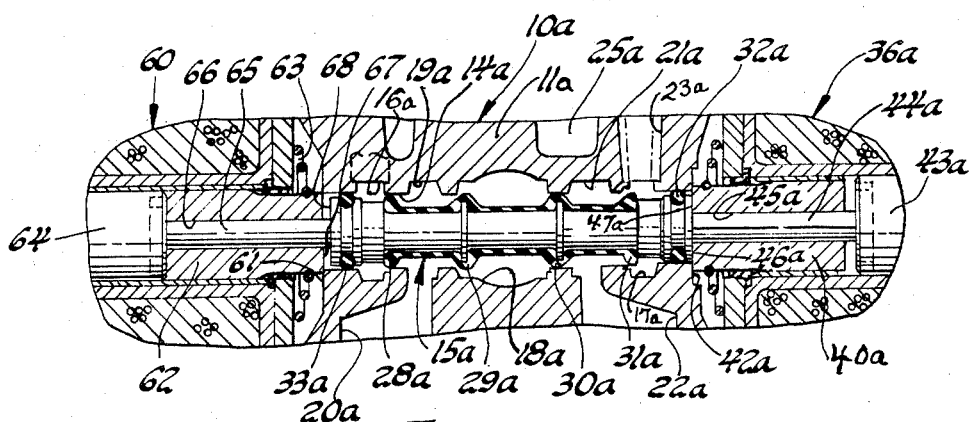
FIG. 2 is a fragmentary view of a four-way directional flow control air valve employing a valve spool that is direct solenoid operated in both directions.

FIG. 2 illustrates a second embodiment of the invention, designated by the numeral 10a. The parts of the valve 10a which are the same as the parts of the first described embodiment of FIG. 1 have been marked with the same reference numerals, followed by the small letter "a". The valve 10a is provided with a second solenoid, generally indicated by the numeral 60, for shifting the valve spool 15a to the right, as viewed in FIG. 2. The solenoid 60 is constructed in the same manner as the solenoid 36a, and it includes a pole piece 62 which is biased by a coil spring 63 against the valve body flat face 61 which is perpendicular to the valve spool bore 14a. In the position shown in FIG. 2, the outer end face 67 of the pole piece 62 is normally positioned against the valve body face 61. The valve spool 15a is provided with an integral, reduced diameter pusher rod or extension shaft 65 which comprises a shaft that is slidably mounted through an axial bore 66 in the pole piece 62. In the position shown in FIG. 2, the solenoid 60 is energized so as to move the armature 64 against the outer end of the pusher rod 65, and move the valve spool 15a a short stroke to the position shown in FIG. 2, and maintain it in such position. When the solenoid 60 is de-energized, and the solenoid 36a is energized, the solenoid 36a moves the valve spool 15a to the left so as to have the left end face 68 seated against the outer end face 67 of the pole piece 62. In the embodiment of FIG. 2, there are two points of reference from which the positional tolerances of the valve spool 15a, in the body 11a, may be determined, namely, the valve body right end face 42a, and the valve body left end face 61. The lengths of the pole pieces 40a and 62, the lengths of the pusher rods or shafts 44a and 65, and the spool tolerances will be controlled in the same manner as defined for the structure illustrated in FIG. 1.

While it will be apparent that the preferred embodiments of the invention herein disclosed are well calculated to achieve the results aforestated, it will be appreciated that the invention is susceptible to modification, variation and change.

INDUSTRIAL APPLICABILITY

The four-way directional flow control air valve of the present invention is adapted for use in industrial air use applications for controlling the operation of an air cylinder in both directions. The air cylinder would be employed in various types of industrial machines.

I claim:

1. A directional flow control valve including a valve body having a valve spool bore in which is slidably mounted an elongated valve spool provided with a plurality of annular valve members for sliding sealing engagement with a plurality of lands in said valve bore, and wherein said valve spool is shiftable directly by a solenoid in a short stroke, between a first position and a second position, to control the flow of pressurized air through the valve in one direction and the exhaustion of air through the valve in another direction, characterized in that:
   (a) the valve includes means engageable with one end of said valve spool for moving said valve spool to said first position;
   (b) a solenoid is mounted on said valve body for direct engagement with said valve spool to move it to said second position, and the solenoid includes a pole piece having one end seated against one end of the valve body adjacent one end of said valve bore, and the tolerances for forming the valve spool lengthwise, and the valve bore through the valve body lengthwise, and the length of the solenoid pole piece and push rod are determined from said one end of the valve body;
   (c) the solenoid includes means for resiliently biasing said pole piece to the position seated against the valve body;
   (d) the other end of said valve spool is seated against said solenoid pole piece when the valve spool is in said first position;
   (e) said solenoid includes an armature movable into shifting engagement with said other end of the pole piece when the solenoid is energized; and,
   (f) a pusher rod is movably mounted through an axial bore in said solenoid pole piece, and it has one end in operative engagement with said other end of said valve spool and the other end in engagement with said armature, whereby, when said solenoid is energized, said armature moves the pusher rod and the valve spool through a short stroke, from said first position with the annular valve members in sealing engagement with a first set of said lands to said second position with the annular valve members in sealing engagement with another set of said lands, and when said solenoid is de-energized, said means engageable with said one end of said valve spool moves the valve spool back to the first position.

2. A directional flow control valve as defined in claim 1, characterized in that:
   (a) the amount of travel that the valve spool is moved from said first position to said second position by said armature when the solenoid is energized, is equal to the difference in length between said pole piece and said pusher rod.

3. A directional flow control valve as defined in claim 2, characterized in that:
   (a) said pusher rod has said one end integral with said other end of said valve spool.

4. A directional flow control valve as defined in claim 3, characterized in that:
   (a) said means for resiliently biasing said pole piece to the position seated against the valve body comprises a spring means.

5. A directional flow control valve as defined in any-one of claims 1 through 4, characterized in that:
   (a) said means engageable with one end of said valve spool for moving said valve spool to said first position, includes a return spring means.

6. A directional flow control valve as defined in claim 1, characterized in that:
   (a) the said means engageable with said one end of said valve spool for moving said valve spool to said first position comprises another solenoid.

7. A directional flow control valve as defined in claim 6, characterized in that:
   (a) said another solenoid is mounted on said valve body for moving said valve spool to said first position, and said another solenoid includes a pole piece having one end seated against the valve body adjacent the other end of said valve bore;
   (b) said another solenoid includes means for resiliently biasing said last named pole piece to the position seated against the valve body;
   (c) said one end of said valve spool is seated against said last named solenoid pole piece when the valve spool is in said second position;
   (d) said another solenoid includes an armature movable into engagement with the other end of the last named pole piece when said another solenoid is energized; and,
   (e) a pusher rod is movably mounted through a bore in said last named solenoid pole piece, and it has one end in operative engagement with said one end of said valve spool and the other end engageable by said last named armature, whereby when said another solenoid is energized, said last named armature moves the last named pusher rod and the valve spool from said second position to said first position.

8. A directional flow control valve as defined in claim 7, characterized in that:
   (a) the pusher rod of said another solenoid has said one end integral with said one end of said valve spool.

9. A directional flow control valve as defined in claim 8, characterized in that:
   (a) said means for resiliently biasing the pole piece of said another solenoid to the position seated against the valve body comprising a spring means.

* * * * *